(12) United States Patent
Hilton et al.

(10) Patent No.: US 7,443,781 B2
(45) Date of Patent: Oct. 28, 2008

(54) REDUCING VARIATIONS IN DENSITY OF PERTURBATIONS ON A STORAGE MEDIUM

(75) Inventors: Richard L. Hilton, Boise, ID (US); Curt Van Lydegraf, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 10/902,448

(22) Filed: Jul. 29, 2004

(65) Prior Publication Data
US 2006/0023612 A1  Feb. 2, 2006

(51) Int. Cl.
G11B 7/00 (2006.01)
(52) U.S. Cl. ...................................... 369/126
(58) Field of Classification Search ................ 369/126, 369/275.3, 100
See application file for complete search history.

(56) References Cited
U.S. PATENT DOCUMENTS

| | | | |
|---|---|---|---|
| 3,810,111 A | 5/1974 | Patel | |
| 4,027,335 A | 5/1977 | Miller | |
| 4,234,897 A | 11/1980 | Miller | |
| 5,398,229 A * | 3/1995 | Nakayama et al. | 369/126 |
| 6,016,330 A | 1/2000 | Ashley et al. | |
| 6,101,164 A * | 8/2000 | Kado et al. | 369/126 |
| 7,245,575 B2 * | 7/2007 | Antonakopoulos et al. | 369/126 |
| 2002/0034031 A1 | 3/2002 | Sakai | |

\* cited by examiner

Primary Examiner—Nabil Z Hindi

(57) ABSTRACT

A method of storing data in a storage device having a probe to form perturbations in a storage medium of the storage device includes receiving input write data bits and encoding the input write data bits to form coded write data bits. Perturbations are formed in the storage medium by contacting a probe to the storage medium, the perturbations corresponding to the coded write data bits, wherein the coded write data bits provide a generally uniform distribution of the perturbations on the storage medium.

17 Claims, 5 Drawing Sheets

REDUCING VARIATIONS IN DENSITY OF PERTURBATIONS ON A STORAGE MEDIUM

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device (referred to as a "probe-based storage device") is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0."

Dents are typically formed by heating a probe tip to a write temperature to melt regions on a storage medium, with the melted regions forming the dents. During read operations, the probes are also heated to a read temperature (usually lower than the write temperature). Detection of whether a probe has encountered a dent is based on the detected resistance of the probe, which resistance is proportional to the temperature of the probe. If the probe tip is engaged in a dent, the probe is brought into closer proximity to the surface of the storage medium. The closer proximity of the probe to the storage medium enables greater dissipation of heat from the probe to the storage medium, which causes the temperature of the probe to drop. The drop in temperature causes the resistance of the probe to change. Circuitry in the storage device is able to detect the change in resistance to thereby determine if dents are present in respective storage cells.

Often, the density of dents formed in a storage medium can vary by region of the storage medium. Thus, in some regions of the storage medium, there may be relatively high densities of dents. In other regions of the storage medium, there may be relatively low densities of dents. Heat dissipation from a probe is usually lower when the probe is in a region with a relatively high density of dents. Thus, as the probe moves about relative to the storage medium, the heat dissipation and therefore the probe temperature may vary.

The variations in densities of dents across a storage medium, and the consequent variations in probe temperatures during read operations, contribute to undesirable additive noise to readback signals. A readback signal is a signal produced by the probe during a read operation. The noise added to readback signals can lead to an increase in read data errors.

DETAILED DESCRIPTION

Figure 1:
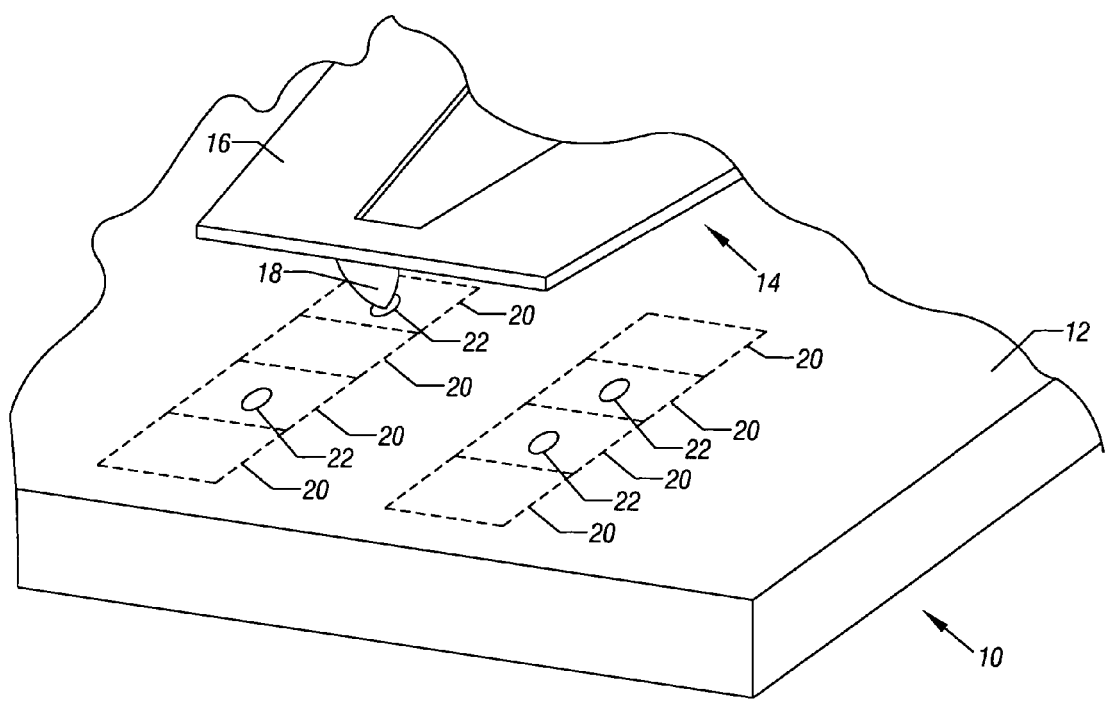
FIG. 1 illustrates a probe-based storage device having a storage medium in which perturbations can be formed by probes, in accordance with some embodiments of the invention.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

The storage medium has a storage surface 12 on which perturbations can be formed by a tip 18 of a probe 14. The "perturbation" formed on a storage medium is any disturbance (physical, electronic, chemical, or otherwise) that is created in a particular region of the storage medium to represent a data state. The tip 18 of the probe 14 is attached to and extends outwardly from a cantilever 16 of the probe 14. According to some embodiments, the probe 14 is a very small probe (on the order of nanometers) that is built using nanotechnology techniques. Such a probe is referred to as nanotechnology probe. Although only one probe is shown in FIG. 1, additional probes are also included in the storage device.

FIG. 1 shows an array of storage cells 20. Note that a large number of storage cells 20 can be formed on the storage medium, with a subset of such storage cells 20 shown in FIG. 1 for purposes of illustration. In each storage cell 20, the tip 18 of a probe 14 can cause selective formation of a perturbation, such as a dent 22, which is basically a pit or hole that is formed into the storage medium. In the arrangement of FIG. 1, one probe 14 is used to interact with storage cells 20. Additional probes 14 may also be provided in the storage device.

The presence of a dent 22 in a storage cell represents a first storage state (e.g., logical "1"), while the absence of the dent represents a second storage state (e.g., logical "0"). To write to the storage medium, the probe 14 is scanned along a track across the storage surface 12, with the tip 18 heated and contacted to selected positions on the storage medium to form corresponding dents 22. To read from the storage medium, the probe 14 is also scanned along a track across the storage medium. Detection of whether a dent is present or not in a storage cell 20 is based on a signal that is received from the probe 14.

To create a dent 22, the probe tip 18 is locally heated to a predetermined write temperature (e.g., up to about 400° C. or greater) for some amount of time. The heat from the probe tip 18 melts the storage surface 12 at the contact point of the tip 18. When a force is applied onto the probe 14 against the storage surface 12, the tip 18 imprints the dent 22. The applied force can be an incremental, applied force, or alternatively, a constant force due to the elastic nature of the cantilever 16. For example, the storage device can be assembled such that the cantilever 16 is bent back a little and thus applies constant force on the storage surface 12. To enable formation of the dents 22, at least a layer of the storage substrate 10 (the layer adjacent the storage surface 12) is formed of a relatively soft material. An example of such a soft material is polymer (e.g., PMMA or polymethylmethacrylate). Other materials can be used in other implementations.

Instead of forming dents 22 in storage cells 20, other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing tunneling effects to move and remove atoms or charge to or from the medium, or storing/removing charge from a particular region. Such other types of perturbations can also be formed by the probes 14 during write operations, and detected by the probes during read operations.

Figure 2:
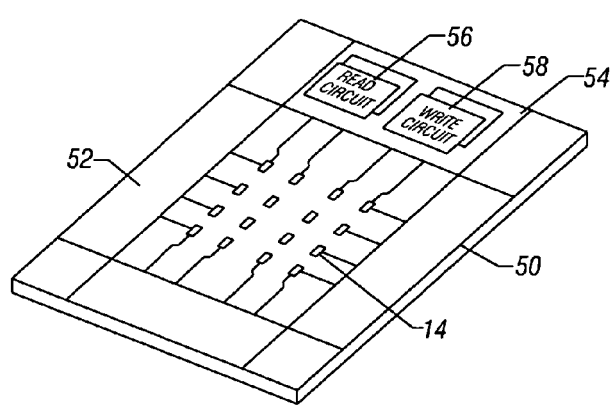
FIG. 2 is a schematic diagram of a probe substrate containing an array of probes and peripheral circuitry to interact with such probes in the probe-based storage device of FIG. 1.

FIG. 2 illustrates a probe substrate 50 that includes an array of probes 14 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 14 may be activated by the select lines to read from or write to storage cells that the probes are in contact with. This structure enables concurrent access of multiple cells in one operation, which improves access speeds.

The peripheral circuitry 52 and/or 54 also include read circuits 56 and write circuits 58. Alternatively, the read circuits 56 and write circuits 58 are placed elsewhere on another support structure (not shown) to provide additional space on the probe substrate 50 for the probes. In such an alternative arrangement, the peripheral circuitry 52 and/or 54 includes multiplexers (not shown). Each multiplexer multiplexes signals from plural probes to a respective read or write circuit. Each write circuit 58 causes data to be written by a probe 14 to selected storage cell(s). Each read circuit 56 detects readback signals from the probes 14 and converts the readback signals to a digital representation of a logical "0" or a logical "1."

Figure 3:
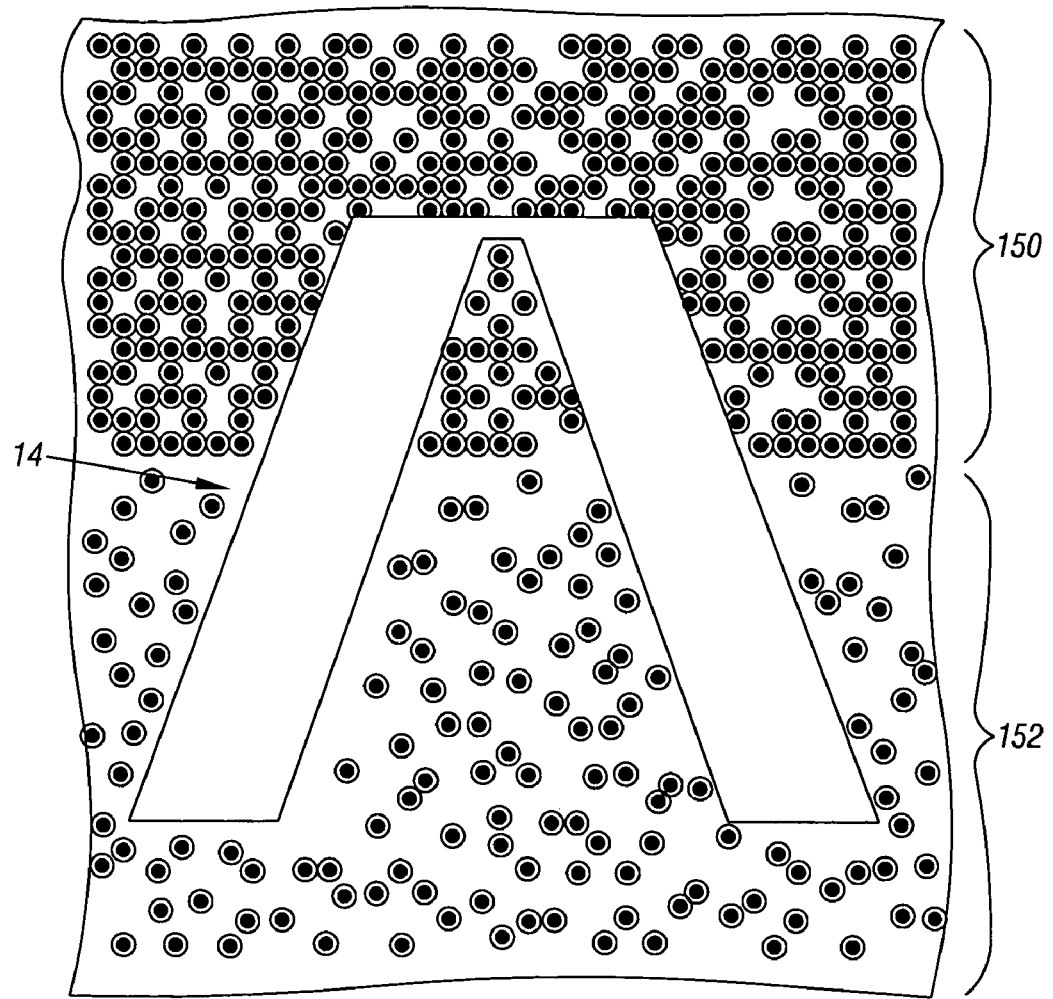
FIG. 3 illustrates a portion of the storage medium with regions of varying densities of dents.

One of the issues associated with probe-based storage devices is the possibility that the average densities of dents (or other types of perturbations) in different regions of a storage medium can differ. An example of regions with different average densities of dents is illustrated in FIG. 3. FIG. 3 depicts two regions 150 and 152, where region 150 has a substantially higher density of dents than region 152. Thus, when the probe 14 is reading from storage cells in region 150, the amount of heat dissipation from the probe 14 to the storage medium will be less than when the probe is reading storage cells in the less dense region 152. A greater density of dents in the region 150 effectively creates a larger distance between the probe cantilever and the surface of the storage medium, due to the fact that much of the storage surface 12 (FIG. 1) is removed in this region of dense dents. The larger distance results in less heat dissipation from the probe cantilever to the storage medium surface.

During a read operation in a storage device that implements a resistance-based readback scheme, the variations in heat dissipation of the probe cantilever due to non-uniform dent densities can lead to variation in resistances of the probe cantilever (which may adversely impact the readback signal detected by a read circuit 56).

In a different implementation, a capacitance-based readback scheme can be used, where the distance between a cantilever and the storage medium determines the capacitance between the cantilever and the storage medium. Generally, if the probe tip is engaged in a dent, the cantilever is in closer proximity to the storage medium, which provides a first capacitance. If the probe tip is not engaged in a dent, then the cantilever is farther away from the storage medium. The greater distance between the cantilever and storage medium results in a second capacitance. The different capacitance values are detected during a read by a read circuit 56 to detect whether a storage cell includes a dent. However, non-uniform densities of dents in the storage medium can lead to variations in the detected capacitance values, which may cause errors during readback for capacitance-based readback schemes.

Figure 4:
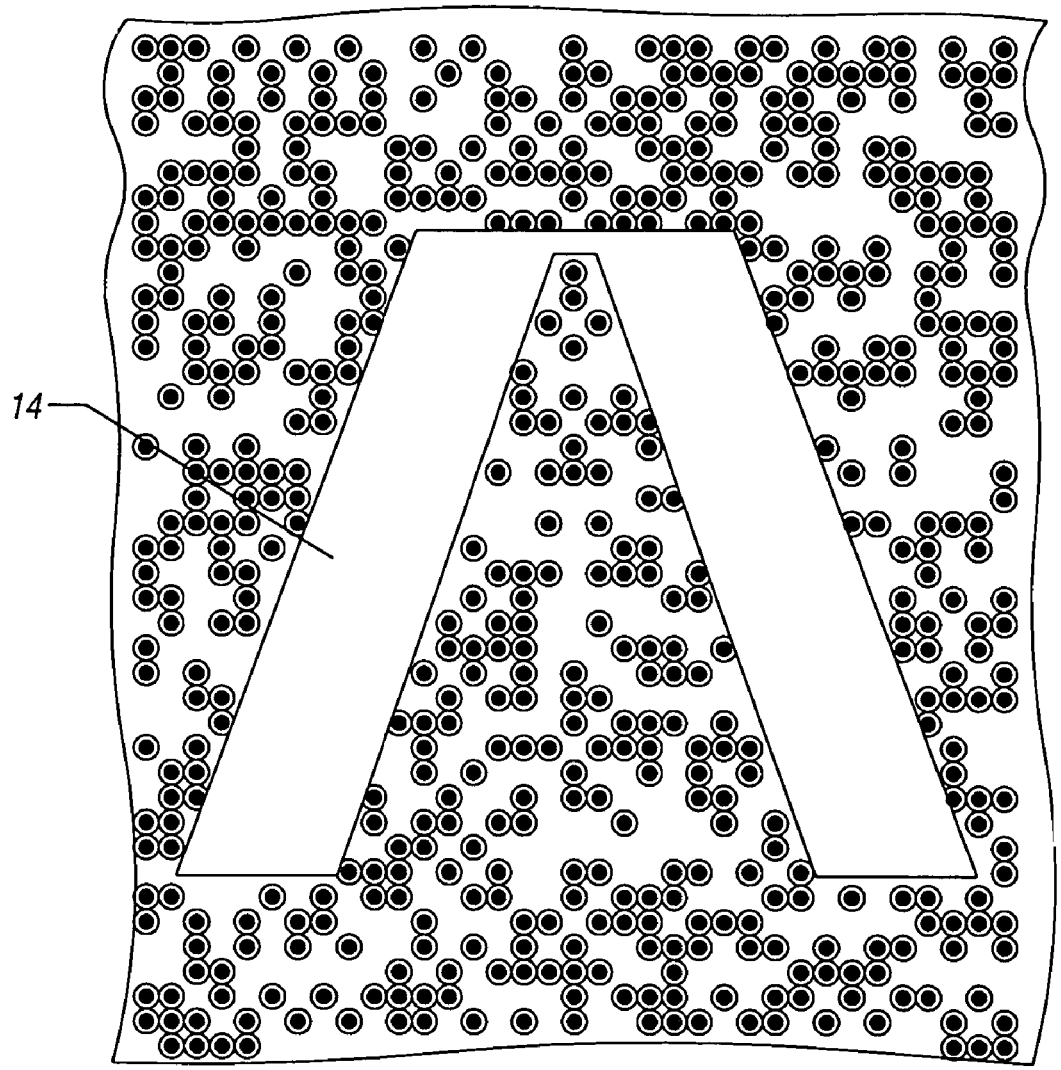
FIG. 4 illustrates a portion of the storage medium with a relatively uniform distribution of dents, in accordance with an embodiment.

To reduce the variation of densities of dents in different regions of the storage medium, a predetermined coding algorithm is applied to input write data. Thus, rather than directly writing the input write data to the storage medium, coded write data is written to the storage medium instead. The coding algorithm applied to the input write data causes the number of "0" data bits and the number of "1" data bits to be as close as possible. A more even distribution of dents is depicted in FIG. 4, where the average densities of dents in different regions of the storage medium are more uniform than the storage medium depicted in FIG. 3. The more uniform distribution of dent densities results in less variation in detected resistances or capacitances during readback.

In accordance with some embodiments of the invention, the coding algorithm applied is DC free coding. DC free coding is designed to remove any net DC component from a sequence of data bits. Thus, in response to an input sequence of data bits that contains a larger number of "1" data bits than "0" data bits, or vice versa, application of DC free coding to the input sequence of data bits produces a sequence of coded data bits in which the number of "1" data bits is substantially the same as the number of "0" data bits. In one implementation, an example type of DC free coding that can be used is the DC free coding described in U.S. Pat. No. 4,027,335. In another implementation, another DC free coding that can be applied is described in U.S. Pat. No. 4,234,897. Other types of DC free coding can be used in other embodiments.

According to another embodiment, balanced coding is applied to input write data to reduce variations of densities of dents in different regions of the storage medium. Balanced coding produces coded data (referred to as "codewords") that is balanced. Each codeword contains exactly the same number of "1"s as "0"s. Balanced coding is a special form of DC free coding. Note that DC free coding may not achieve exactly the same number of "0"s and "1"s in a given sequence of data bits. In balanced coding, each codeword (that includes a predetermined number of write data bits) has exactly the same number of "1"s and "0"s. An input stream of write data is converted into codewords each having a balanced number of "1"s and "0"s.

In yet another embodiment of the invention, the coding algorithm that is applied to the input write data is randomizing coding. To apply randomizing coding, the input write data is provided to a pseudo-random number generator. The pseudo-random number generator causes generation of random numbers based on sets of input write data. Randomizing the input write data leads to a more even distribution of "1"s and "0"s in the randomized data.

Figure 5:
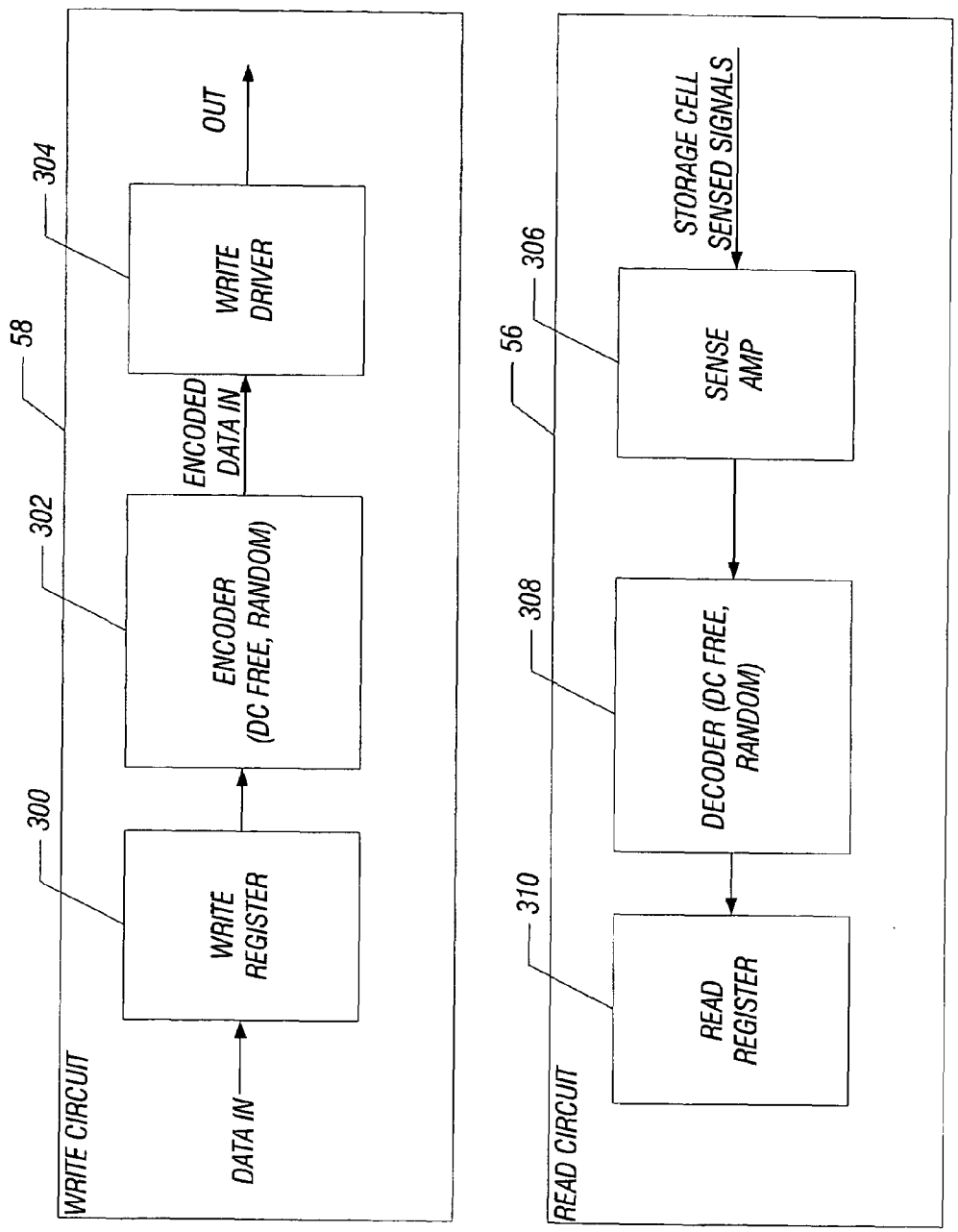
FIG. 5 illustrates write and read circuits, according to an embodiment of the invention.

FIG. 5 illustrates a write circuit 58 and read circuit 56. Note that the write circuit 58 and read circuit 56 are part of a set of write and read circuits for one channel of the storage device. Typically, a storage device includes multiple channels that are associated with respective sets of write and read circuits. Each channel typically is associated with a corresponding set of probes for writing to or reading from a respective region of the storage medium.

The write circuit 58 includes a write register 300 to receive input write data. The write data is serialized and provided in a serial stream to an encoder 302. The encoder 302 applies a predetermined coding algorithm to the input write data. The coding algorithm applied by the encoder 302 can be any one of DC free coding, balanced coding, randomizing coding, or some other coding, that tends to produce a relatively uniform density of dents (or perturbations). The encoded data from the encoder 302 is provided to a write driver 304, which drives a selected one of multiple probes. The write driver 304 provides a write signal output, which is an electrical signal that is provided to the cantilever of the selected probe. The end of the probe cantilever includes a resistive region that heats up in response to the write signal applied to the probe cantilever. Heating of the resistive region causes the probe tip to heat up to a desired temperature, such as the write temperature, which enables formation of a dent. The write driver 304 applies a write signal to the probe to cause formation of a dent for writing a logical "1" data bit. However, to write a logical "0" data bit, the write driver 304 does not apply the write signal, which causes the probe to not form a dent.

In the read circuit 56, a sensed signal from a probe is received by a sense amplifier 306. The sense amplifier 306 detects a data state of the storage cell being read, and produces an output representing the detected data state. The output from the sense amplifier 306 is provided to a decoder 308, which applies decoding based on the predetermined coding algorithm applied by the encoder 302 of the write circuit 58 during the write operation. The decoder 308 reverses the encoding applied by the encoder 302. The decoder 308 collects a number of read data bits before applying the decoding on the collection of data bits. The decoding removes the DC free coding, balanced coding, randomizing coding or other coding that was applied by the encoder 302. The output of the decoder produces decoded read data that is stored in a read register 310 for access by other circuitry in the storage device.

Figure 6:
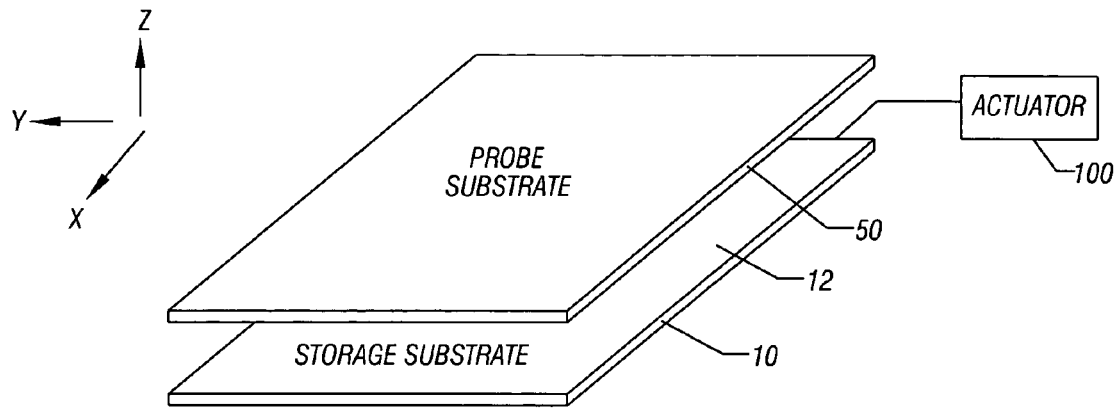
FIG. 6 illustrates the probe substrate positioned to face the storage substrate in the probe-storage device of FIG. 1.

As shown in FIGS. 1 and 6, the probe substrate 50 is placed with the surface containing the probes 14 facing the storage surface 12 of the storage substrate 10, on which the storage cells are formed. The probe substrate 50 is positioned over the storage substrate 10 so that the probe tips 18 (FIG. 1) of the probes 14 point downwardly to engage the storage surface 12 of the storage substrate 10. In an alternative arrangement, the storage substrate 10 is positioned over the probe substrate 50 so that the probe tips 18 point upwardly to face the storage surface 12. In other arrangements, the probe substrate 50 and the storage substrate 10 can have a side-to-side relationship.

The storage substrate 10, in the example of FIG. 6, is coupled to an actuator 100 that is designed to move the storage substrate 10 in both X and Y directions such that probes 14 (FIG. 1) can be placed over desired storage cells on the storage substrate 10. Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 7:
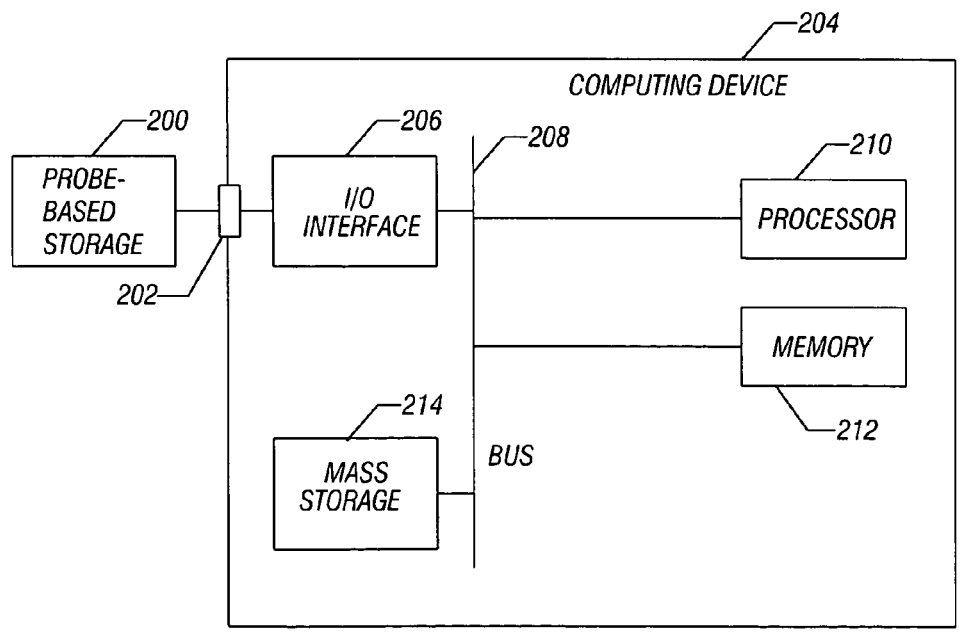
FIG. 7 is a block diagram of a system that includes a computing device having a port to connect to a probe-based storage device that incorporates an embodiment of the invention.

The probe-based storage device according to some embodiments can be packaged for use in a computing system. For example, as shown in FIG. 7, a probe-based storage device 200 that incorporates an embodiment of the invention is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
a storage medium;
a probe to form perturbations in the storage medium, wherein the probe comprises a nanotechnology probe;
an encoder to receive write data and to encode the write data according to an algorithm to reduce variations in density of perturbations on the storage medium, wherein the encoder is adapted to encode the write data by applying DC free coding to the write data,
wherein the probe is adapted to form perturbations in the storage medium corresponding to data bits of the encoded write data.

2. A storage device comprising:
a storage medium;
a probe to form perturbations in the storage medium, wherein the probe comprises a nanotechnology probe;
an encoder to receive write data and to encode the write data according to an algorithm to reduce variations in density of perturbations on the storage medium, wherein the encoder is adapted to encode the write data by applying randomizing coding to the write data,
wherein the probe is adapted to form perturbations in the storage medium corresponding to data bits of the encoded write data.

3. The storage device of claim 1, further comprising:
a read circuit to receive readback signals from the probe,
wherein the read circuit includes a decoder to decode a collection of data bits corresponding to the readback signals, the decoder to reverse encoding applied by the encoder.

4. The storage device of claim 1, further comprising:
additional probes to form perturbations in the storage medium; and
additional encoders each to receive write data and to encode the corresponding received write data according to the algorithm to reduce variations in density of perturbations on the storage medium.

5. The storage device of claim 1, wherein the probe is adapted to be heated to a write temperature to form the perturbations, the perturbations comprising dents.

6. The storage device of claim 5, wherein the probe is adapted to be heated to a read temperature to read storage cells in the storage medium, the storage device further comprising:
a read circuit to detect a resistance of the probe based on a temperature of the probe.

7. The storage device of claim 6, wherein the probe comprises a tip, wherein a first amount of heat dissipation occurs from the probe to the storage medium in response to the probe tip being engaged in a dent, and a second amount of heat dissipation occurs from the probe to the storage medium in response to the probe tip not being engaged in a dent.

8. The storage device of claim 1, further comprising:
a read circuit to detect a capacitance between the probe and the storage medium to detect a data state.

9. A method of storing data in a storage device having a probe to form perturbations in a storage medium of the storage device, comprising:
receiving input write data bits:
encoding the input write data bits to form coded write data bits according to a DC free coding; and
forming perturbations in the storage medium by contacting a probe to the storage medium, the perturbations corresponding to the coded write data bits, wherein the coded write data bits provide a generally uniform distribution of the perturbations on the storage medium.

10. A method of storing data in a storage device having a probe to form perturbations in a storage medium of the storage device, comprising:
receiving input write data bits;
encoding the input write data bits to form coded write data bits to a randomizing coding; and
forming perturbations in the storage medium by contacting a probe to the storage medium, the perturbations corresponding to the coded write data bits, wherein the coded write data bits provide a generally uniform distribution of the perturbations on the storage medium.

11. The method of claim 9, further comprising:
receiving signals from the probe during a read operation, the received signals corresponding to data bits from storage cells in the storage medium;
decoding the read data bits, wherein the decoding reverses the encoding performed.

12. The method of claim 9, wherein forming the perturbations comprises forming the perturbations with a nanotechnology probe.

13. A system comprising:
a processor: and
a storage device coupled to the processor, the storage device comprising:
a storage medium:
a probe to contact the storage medium to form dents in the storage medium;
an encoder to receive write data and to encode the write data according to a predetermined algorithm, wherein encoding according to the predetermined algorithm provides a generally uniform distribution of dents on the storage medium, wherein the encoding of the write data according to the predetermined algorithm includes one of DC free coding and randomizing coding,
wherein the probe is adapted to form dents in the storage medium corresponding to data bits of the encoded write data.

14. The system of claim 13, wherein the probe is heated to perform write operations and read operations.

15. The system of claim 14, further comprising:
a read circuit to receive readback signals from the probe during read operations,
wherein the read circuit includes a decoder to decode a collection of data bits corresponding to the readback signals, the decoder to reverse encoding applied by the encoder.

16. The system of claim 13, wherein the probe comprises a nanotechnology probe.

17. The system of claim 13, wherein the probe comprises a tip to form dents in the storage medium.

* * * * *

UNITED STATES PATENT AND TRADEMARK OFFICE
CERTIFICATE OF CORRECTION

PATENT NO. : 7,443,781 B2
APPLICATION NO. : 10/902448
DATED : October 28, 2008
INVENTOR(S) : Richard L. Hilton et al.

It is certified that error appears in the above-identified patent and that said Letters Patent is hereby corrected as shown below:

In column 7, line 24, in Claim 9, delete "bits:" and insert -- bits; --, therefor.

In column 8, line 11, in Claim 13, delete "processor:" and insert -- processor; --, therefor.

In column 8, line 14, in Claim 13, delete "medium:" and insert -- medium; --, therefor.

Signed and Sealed this

Seventeenth Day of March, 2009

JOHN DOLL
*Acting Director of the United States Patent and Trademark Office*